(No Model.)
C. H. MENCK.
WORD COUNTER FOR TYPE WRITING MACHINES.
No. 586,730. Patented July 20, 1897.
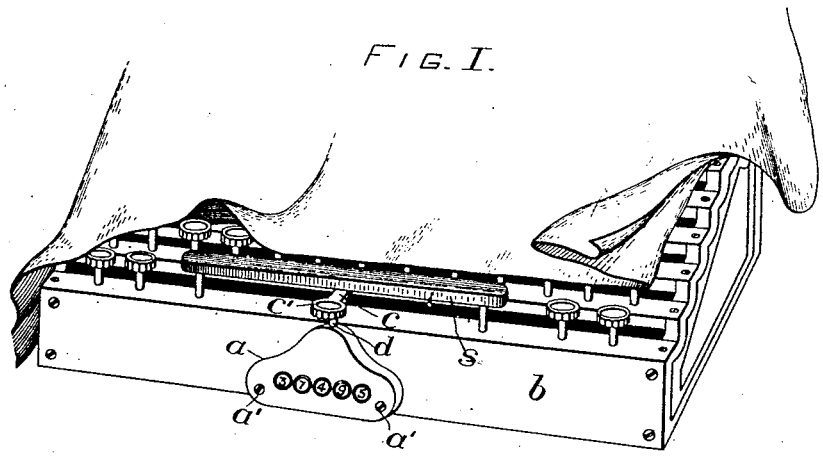
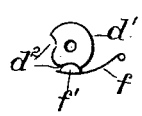
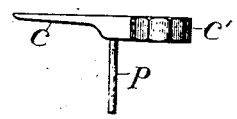
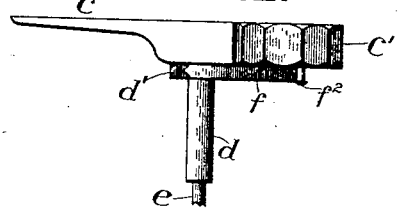
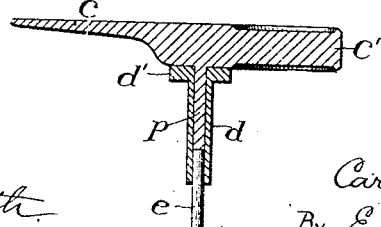
Witnesses
James D. Smith
R. Clinton Balinger
Inventor
Carl H. Menck,
By Edwin Guthrie,
Attorney

UNITED STATES PATENT OFFICE.

CARL H. MENCK, OF GRAND ISLAND, NEBRASKA.

WORD-COUNTER FOR TYPE-WRITING MACHINES.

SPECIFICATION forming part of Letters Patent No. 586,730, dated July 20, 1897.

Application filed March 17, 1897. Serial No. 627,939. (No model.)

*To all whom it may concern:*

Be it known that I, CARL H. MENCK, a citizen of the United States, residing at Grand Island, in the county of Hall and State of Nebraska, have invented certain new and useful Improvements in Word-Counters for Type-Writing Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to devices for mechanically counting and indicating up to any chosen time of observation or at completion the number of words in a piece of work performed upon a type-writing machine, and has for its object the provision of means for accurately and instantly determining the numerical total of words type-written, thus saving the time and avoiding the labor ordinarily required in ascertaining that aggregate by mental computation.

I accomplish the object stated by employing any common form of indicator capable of being operated by the vertical reciprocation of a plunger-rod, a rigid finger supported on the said rod and arranged to swing in a horizontal circle beneath or otherwise engage the space-bar of a machine, with a suitable spring-latch for holding the finger yieldably in any one of a plurality of predetermined positions.

Each constituent element of my invention is described in detail, and its office, together with the mode of operation of the whole, fully explained hereinbelow.

Referring to the accompanying drawings, wherein like letters are used to designate like parts throughout the several views, Figure I represents a perspective view of my invention attached to a type-writer; Fig. II, a side view of the flanged sleeve; Fig. III, a top plan view of the flanged sleeve and spring-latch detached; Fig. IV, a side view of the rigid swinging finger and its depending pivot-pin; Fig. V, a side view of my invention, indicator omitted; and Fig. VI, a vertical mid-sectional view of the parts shown in the fifth figure. The scale of drawing has been slightly increased in the last two figures for clearness of illustration.

Considering Fig. I, $a$ designates the indicator, having the usual casing pierced by a row of orifices at which are caused to appear index-numerals depending upon the relative positions of component parts. There are a number of indicator mechanisms in use at the present time that are actuated by push-pins, and it is believed to be clearly within the purview of my invention to employ either or all said forms of indicators in practice, if desired. Further, the manner of modifying almost any style of rotary indicator to fit my purpose is a matter of simple construction and knowledge common to every mechanic of average skill and experience. For these reasons I have not complicated my application by the introduction of detail drawings and description of any indicator beyond what is shown in Fig. I and specified hereinabove. Screws $a'$ $a'$ through the casing may be employed, or equivalent means may be adopted to attach the indicator in any convenient position to the frame $b$ of a type-writing machine, from which position the finger $c$ may be turned or otherwise caused to project beneath the space bar or key of the machine.

So far as I am aware it is the common practice of builders of type-writing devices of the better class to effect the imprint by lever-operated type-bars driven upwardly by downward blows upon keys or headed push-pins suitably placed and connected with the lever system. It is least laborious, therefore, to set in motion by a like downward blow the mechanism introduced to separate the printed words, and for this purpose one or more space keys or bars are ordinarily provided. Such keys or bars vary in size and position in different machines, and it is believed to be within the scope of my invention to so form the finger $c$ when my invention is applied to a given make of machine that any movement of space key or bar will be transmitted to the finger when the two parts are thrown into engagement.

As ordinarily fashioned finger $c$ possesses a finger-bearing $c'$ similar in contour to the keys of the machine. (See Figs. I, IV, and V.)

In Fig. II, $d$ marks a sleeve or tube having a circular flange $d'$, (see Fig. III,) indented by curving recesses $d^2$ $d^2$, usually at quadrantal points. Sleeve $d$ is secured about the extremity or made integral with the plunger or push-pin $e$, which operates the indicator, as already explained.

Considering Fig. III, there will be seen a detached view of the spring-latch, consisting of spring $f$, having a rounded lug $f'$, corresponding generally in size and form to recesses $d^2$, and in Fig. V will be noted pin $f^2$, passing through a terminal eye in the spring and driven to the under surface of the finger, making the end of the spring fast. It is believed to be sufficiently clear from the drawings that assuming pivot-pin $p$, which is dependently secured perpendicular to the finger, (see Fig. IV,) to be inserted within sleeve $d$ (see Fig. VI) and lug $f'$ caused to engage one of recesses $d^2$, the finger may be swung around in a horizontal plane and yieldably stopped in positions at right angles with each other. In one of such positions the finger projects beneath the space-bar $s$, Fig. I, and in the other position lies parallel thereto. The first position of the finger enables the indicator to count and exhibit the number of words printed, the second position releasing the indicator. One advantage gained by turning the finger on a pivot lies in the fact that at no time does the finger project much beyond the frame $b$. This advantage could not be put forward were the finger arranged to be pushed directly under and withdrawn from beneath the space-bar.

I am aware that indicators (for computing the number of letters struck) have been attached to type-writing machines, and I do not claim that feature broadly.

Having completely described my invention, what I do claim, and seek to protect by Letters Patent of the United States, is—

1. In a word-counter for type-writing machines, the combination of an indicator, a pivoted finger, supporting devices whereon said finger may be given a second movement independent of its pivotal movement, connections whereby the second movement of said finger may be transmitted to and caused to operate said indicator, the said indicator being unaffected by the pivotal movement of the finger, substantially as described.

2. In a word-counter for type-writing machines, the combination of an indicator provided with an operating push-pin, clamping devices for securing said indicator to the frame of a type-writing machine, a sleeve or tube secured to said push-pin, a finger having a pivot-pin movably fitting said sleeve interiorly, and spring-governed latching devices arranged to yieldably hold said finger in any one of a plurality of predetermined positions, substantially as described.

3. The combination of a type-writing machine having a space bar or key, an indicator detachably secured to the frame of said machine, movable connecting devices constructed and arranged to engage the space-bar of said machine and transmit motion therefrom to actuate the indicator, guiding-supports whereon said connecting devices may be moved into and out of engagement with said space-bar, the said movement of engagement and disengagement being independent of the movement whereby said indicator is actuated.

In testimony whereof I affix my signature in presence of two witnesses.

CARL H. MENCK.

Witnesses:
ARNOLD C. KOENIG,
H. C. ROWNTREE.